(12) United States Patent
Canedo Pardo

(10) Patent No.: US 9,790,926 B2
(45) Date of Patent: Oct. 17, 2017

(54) COUNTERWEIGHTING A WIND TURBINE HUB

(71) Applicant: ALSTOM RENEWABLE TECHNOLOGIES, Grenoble (FR)

(72) Inventor: Santiago Canedo Pardo, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 325 days.

(21) Appl. No.: 14/666,239

(22) Filed: Mar. 23, 2015

(65) Prior Publication Data

US 2015/0275854 A1 Oct. 1, 2015

(30) Foreign Application Priority Data

Mar. 28, 2014 (EP) .................................... 14382117

(51) Int. Cl.
*F03D 11/00* (2006.01)
*F03D 13/10* (2016.01)
*F03D 80/00* (2016.01)
*F03D 1/06* (2006.01)

(52) U.S. Cl.
CPC ............. *F03D 13/10* (2016.05); *F03D 80/00* (2016.05); *F03D 1/0658* (2013.01); *Y02E 10/726* (2013.01); *Y02E 10/728* (2013.01); *Y10T 29/49316* (2015.01)

(58) Field of Classification Search
CPC .......... F03D 13/00; F03D 13/10; F03D 13/20; F03D 13/22; F03D 13/25; F03D 80/00; F03D 1/0658; Y10T 29/49316; Y02E 10/728; Y02E 10/726

USPC ........................................................ 416/19
See application file for complete search history.

(56) References Cited

U.S. PATENT DOCUMENTS

2004/0253109 A1  12/2004  Wobben
2013/0272876 A1* 10/2013  Falkenberg ............. F03D 11/00
                                                        416/1

FOREIGN PATENT DOCUMENTS

DE  10 2009 011603    9/2010
EP  2 617 986          7/2013
EP  2 617 987          7/2013
(Continued)

OTHER PUBLICATIONS

European Search Report for EP 14382117, mailed Sep. 12, 2014, 4 pgs.

*Primary Examiner* — Richard Edgar
(74) *Attorney, Agent, or Firm* — Dority & Manning, P.A.

(57) ABSTRACT

Counterweight systems for a wind turbine comprising a hub mounted to a nacelle such that the hub is rotatable around a rotation axis with respect to the nacelle, the hub comprising a blade root region configured to receive a root of a blade and having a pitch system configured to rotate the blade around a pitch axis. The counterweight system comprises a beam mountable to the blade root region at a first point of the beam and a counterweight mass coupled to the beam at a second point of the beam, such that, when the beam is mounted to the blade root region, the beam is arranged substantially perpendicular to the pitch axis and the pitch system can cause the counterweight mass to rotate around the pitch axis. Methods are also provided of mounting one or more blades to a wind turbine hub by using such counterweight systems.

20 Claims, 3 Drawing Sheets

(56) References Cited

FOREIGN PATENT DOCUMENTS

EP 2 650 537 10/2013

\* cited by examiner

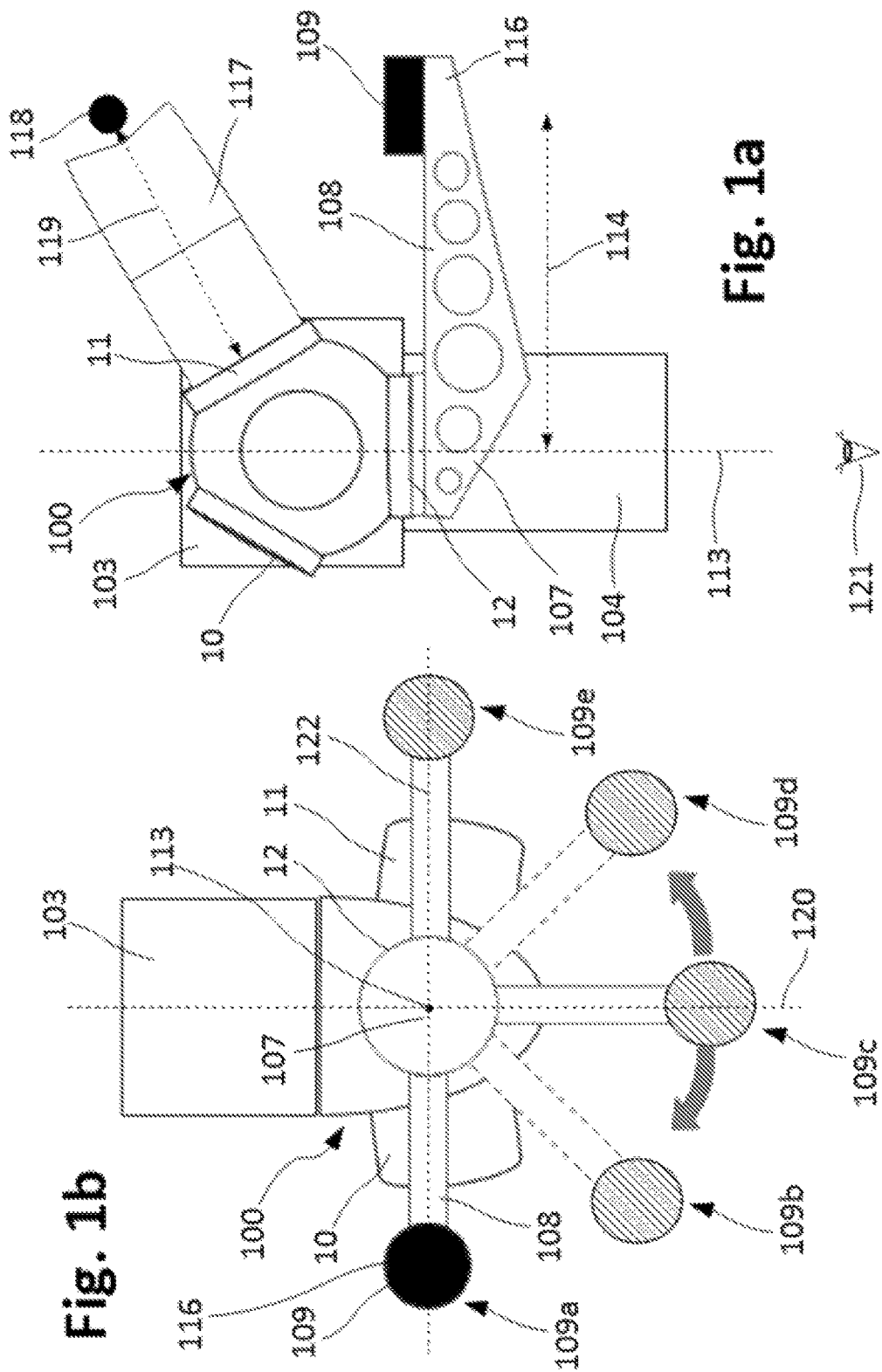

COUNTERWEIGHTING A WIND TURBINE HUB

This application claims priority to EP Application No. 14382117.1 filed Mar. 28, 2014, the entire contents of which are hereby incorporated by reference.

The present disclosure relates to counterweight systems for a wind turbine hub, and to methods of mounting a blade to a wind turbine hub by using one of such counterweight systems.

BACKGROUND

Modern wind turbines are commonly used to supply electricity into the electrical grid. Wind turbines generally comprise a rotor with a rotor hub and a plurality of blades. The rotor is set into rotation under the influence of the wind on the blades. The rotation of a rotor shaft drives a generator rotor either directly ("directly driven") or through the use of a gearbox. The gearbox (if present), the generator and other systems are usually mounted in a nacelle on top of a wind turbine tower.

When wind turbines are erected, the tower is generally constructed first. Then the nacelle, which typically contains the generator and the gearbox (if present), is usually mounted on top of the tower. Then, the hub may be hoisted and mounted. Finally, the blades are hoisted one by one from a ground level towards the rotor hub and mounted therein. In an alternative method, one or more blades may be pre-assembled with the hub when lifting the hub.

The blades may be installed in a variety of ways, e.g. in a substantially vertical manner or substantially horizontally or at other inclined angles. Particularly, in offshore wind turbines, mounting a blade from above the hub may be very complicated, or at least require an enormous crane and jack-up barge. Such an installation method may thus be very expensive and depending on the depth of the sea may simply be impossible.

It is known to hoist a complete rotor assembly, i.e. the hub with blades, and mount it to e.g. the nacelle. But in order to mount a complete rotor assembly, a large surface area is required, which is typically not available in the case of offshore wind turbines.

It is further known to mount an incomplete rotor assembly on the nacelle, e.g. the hub with two blades and subsequently, mounting the remaining blade. In these cases, the rotor with the two blades is normally mounted with the two blades pointing upwards, i.e. "bunny ears" configuration. There is thus no need for rotating the wind turbine rotor as the third blade could be vertically mounted from below. However, in order to be able to perform these rather complicated installation steps, the prevailing wind speed has to be below a predetermined value, for example 6 or 8 m/s for a prolonged period of time. The period of time depends on the expected length of the installation operation and a safety factor to be taken into account.

During certain seasons, windows of several hours in which the wind does not reach the predetermined value of e.g. 6 m/s may not be available very often. In practice, this may mean that personnel and maintenance equipment, including e.g. expensive cranes and jack-up barges, may be in stand-by during days or even weeks. This may represent an enormous cost.

It is known to mount each of the plurality of blades substantially horizontally or substantially vertically. This means that individual installation steps may require less time and may be performed at higher winds, thus increasing the time windows available for installation. However, such methods require rotation of the hub between the mounting of one blade and another. In order to correctly position the hub, torque is required for rotating the wind turbine rotor after mounting one blade in order to mount the next one. When not all blades have been mounted onto the hub, the hub is not balanced, so that the weight of one or more blades has to be carried upwards when rotating the hub. Application of a very high torque may therefore be necessary for rotating the hub.

The torque may be delivered by using the gearbox (when present) with an external power supply for rotating the rotor. Such a system may be used in combination with a locking pin for maintaining the rotor in a desired position for installation. This is not possible in case of directly driven wind turbines as no gearbox is provided between rotor and generator. Even though the generator may be suitable for being operated as a motor, it will generally not be able to deliver the required torque to rotate the hub when the hub is unbalanced, i.e. when at least one but not all the blades have been mounted.

It is an object of the present disclosure to provide systems and methods that at least partially reduces one or more of the aforementioned drawbacks leading to improved methods of installing wind turbine blades especially suitable for direct drive offshore wind turbines.

SUMMARY

In a first aspect, a counterweight system is provided for a wind turbine comprising a hub mounted to a nacelle such that the hub is rotatable around a rotation axis with respect to the nacelle. The hub comprises a blade root region configured to receive a root of a blade and having a pitch system configured to rotate the blade around a pitch axis (i.e. around a longitudinal axis of the blade).

The counterweight system comprises a beam and a counterweight mass. The beam is mountable to the blade root region at a first point of the beam and the counterweight mass is coupled to the beam at a second point of the beam at a certain distance from the first point of the beam. This counterweight beam-mass assembly is configured in such a way that, when the beam is mounted to the blade root region (at the first point), the beam is substantially perpendicular to the pitch axis and the pitch system can cause the counterweight mass to rotate around the pitch axis.

The pitch system may be assisted by some additional drive units, such as e.g. auxiliary gear motors, in causing rotation of the counterweight beam-mass. This may permit providing larger torques to the counterweight beam-mass if needed. If the "standard" pitch system is able to provide large enough torques, using additional drive unit(s) may not be necessary, but may permit relieving the pitch system.

This proposed system may be very suitable for positioning a wind turbine hub such that one or more blades may be mounted to it in predefined desired position(s), such as e.g. horizontally.

An aspect of this counterweight system may be that rotation of the hub may be caused by simply rotating the counterweight mass suitably around a corresponding pitch axis. Rotation of the hub may be induced by operating the counterweight system for suitably counterweighting the weight of the hub when carrying or not some blade(s). Details of examples of operation of the proposed counterweight system for inducing desired rotation(s) of the hub will be explained in other parts of the description.

Said rotation of the hub may be further caused by operating a generator of the wind turbine as a motor, depending on the circumstances. In this case, a relatively small torque provided by the generator/motor may be enough for advantageously assisting the counterweight system to induce the hub to suitably rotate.

Additionally or alternatively to operating a generator as a motor, in some examples, one or more auxiliary gear motors (or gearbox-motor units) may be used for assisting the counterweight system in causing rotation of the hub.

Therefore, the counterweight system may be configured to cause desired rotation(s) of the hub alone or in conjunction with other drive systems, such as e.g. a wind turbine generator operated as a motor, and/or one or more auxiliary gearbox-motor units, etc.

Another aspect of this counterweight system may be that it may be operated to induce suitable weight distributions such that substantially balanced positions of the hub (when e.g. carrying some blade(s)) may be obtained. These balanced weight distributions may be induced by rotating the counterweight mass to a position in which the weight(s) of some blade(s) carried (or to be carried) by the hub may be compensated by the weight of the counterweight mass.

The counterweight system may be operated such that a substantially balanced position of the hub may be achieved in an anticipated manner depending on a (future) weight load to be caused by a blade to be installed. This way, a balanced situation of the hub (including the counterweight mass) may be achieved as a result of mounting the blade to the hub. Alternatively, the counterweight system may be operated a posteriori, i.e. once the blade has been mounted to the hub, for causing the hub to achieve the balanced position.

A substantially balanced situation of the hub may be a non-fully balanced situation, since the weight of the counterweight mass and of the blade(s) (mounted or to be mounted to the hub) may create together a resultant torque on the hub different from zero. The magnitude of said resultant torque may however be relatively small, so the counterweight system may be required to generate a corresponding small torque on the hub to compensate said resultant torque (due to weight loads).

Additionally or alternatively, the above mentioned operation of a wind turbine generator as a motor may also be used for compensating at least in part said resultant torque in a non-fully balanced situation. Additionally or alternatively, the above mentioned operation of (auxiliary) gear motors may also be used for compensating at least in part said resultant torque in a non-fully balanced situation.

Therefore, the counterweight system may be configured and operated to compensate the above mentioned resultant torque in a non-fully balanced situation alone or in conjunction with other drive systems, such as e.g. a wind turbine generator operated as a motor, and/or one or more auxiliary gearbox-motor units, etc.

A still further aspect of the proposed counterweight system may be that no special arrangements may be required in/on the hub for mounting said counterweight system to the hub. Instead, a pre-existing hub region (adapted to receive a blade root) is re-used for mounting the counterweight system to the hub. Installation of a corresponding blade to said region may however require previously dismounting the counterweight system from said region. Moreover, a pitch system comprised in said pre-existing hub region is used for driving the counterweight system.

The hub may be configured to carry a plurality of blades each having a mass and a centre of mass. In examples of the counterweight system, the distance between the first and second points of the beam and the mass of the counterweight mass may be selected in such a way that moment(s) induced on the hub by already mounted blade(s) may be suitably compensated by corresponding moment(s) induced on the hub by the counterweight system. This may permit achieving ("in advance" or "a posteriori") balanced positions of the hub more easily and efficiently.

According to some implementations, the beam may be a telescopic beam such that the distance between the first and second points of the beam can be varied. This way, the counterweight system may be customized depending on the particular configuration of the wind turbine in which the counterweight system is to be used. For example, the counterweight system may be used for installing blades of different sizes by suitably varying the distance between the first and second points of the beam.

For example, the telescopic bar may be extended or contracted depending on whether some further drive unit (e.g. wind turbine generator operated as a motor, auxiliary gearbox-motor units, etc.) is used for acting on the hub. Also, the telescopic bar can be used to move from a substantially balanced position to an unbalanced position in which the counterweight may cause a desired rotation of the hub.

In yet further examples, another arrangement for changing a distance between counterweight mass and pitch axis may be provided in that a counterweight mass may be arranged to be slidable within a guide of the beam.

The proposed counterweight system may be particularly suitable for use in/on direct drive wind turbines. Examples of the counterweight system may therefore be mounted to direct drive wind turbines for e.g. installing blades on said direct drive wind turbines.

A wind turbine may thus be also provided comprising a hub and any one of the previously described counterweight systems. In this wind turbine, the hub may comprise a blade root region which is configured to receive a blade root and has a pitch system, and the counterweight system may be mounted to said blade root region.

In a second aspect, a method is provided for mounting a blade to a hub of a wind turbine by using any one of the previously described counterweight systems. In said wind turbine, the hub is mounted to a nacelle such that the hub is rotatable around a rotation axis with respect to the nacelle. Moreover, the hub comprises a blade root region configured to receive a blade root and having a pitch system, and the counterweight system is mounted to said blade root region with the pitch system.

The method comprises operating the pitch system for causing rotation of the counterweight mass for causing rotation of the hub to a desired position for mounting the blade to the hub. The method further comprises mounting the blade to the hub.

As commented above, any of the previously described counterweight systems may be used for causing desired rotation(s) of the hub. This use of the counterweight system in the proposed method (for mounting a blade) is based on taking advantage of weight loads, without the necessity of a powerful drive system for "directly" rotating the hub.

Some additional drive unit(s), such as e.g. auxiliary gear motor(s), may be operated for assisting the pitch system in causing rotation of the counterweight beam-mass. This may permit providing larger torques (to the counterweight beam-mass) and/or relieving the pitch system.

In examples of the method, one or more drive units (e.g. generator operated as a motor, auxiliary gear motors, etc.)

may be used in conjunction with the counterweight system for causing rotation of the hub to the desired position for mounting the blade.

In some configurations, the wind turbine may further comprise a locking system for locking (rotation of) the hub. Taking this assumption into account, the method may further comprise operating this locking system (of the wind turbine) for locking the hub once the desired position of the hub has been achieved. Additionally or alternatively, some additional system(s) (e.g. wind turbine generator operated as a motor, auxiliary gear motor(s), etc.) may be operated for retaining the hub in a certain position.

According to examples of the method, the pitch system (and optionally some other system(s)) may be operated for causing rotation of the counterweight mass to a position for at least partially compensating a variation of torque on the hub due to weight loads resulting from mounting the blade to the hub.

Mounting the blade to the hub may cause weight load(s) due to the weight of the blade, which may induce a corresponding torque on the hub. In some examples, this torque may be anticipated before installation of the blade, and so it may be compensated in advance (before installation of the blade). In this case, the balanced position of the hub will occur upon installation of the blade. Alternatively, operating the counterweight system for causing the hub to achieve the balanced position may be performed a posteriori, i.e. once the blade has been mounted to the hub.

A balanced position of the hub (caused in advance or a posteriori) may be induced by further using some additional drive unit(s), such as e.g. a wind turbine generator operated as a motor, an auxiliary gear motor, etc.

A substantially balanced position of the hub (caused in advance or a posteriori) may permit performing a next iteration of the method for mounting a next blade to the hub without requiring the counterweight system (alone or in conjunction with some other drive unit(s)) to induce high torque(s) on the hub, since said next iteration will start from a balanced situation of the hub. Several iterations (as many as blades to be mounted) may thus be performed in the form of transitions from a first balanced situation of the hub to a second balanced situation of the hub.

As commented above, a substantially balanced situation of the hub may be a non-fully balanced situation, since corresponding weights may create together a resultant torque on the hub different from zero. Said resultant torque may be compensated by causing a relatively small "counter" torque on the hub. This "counter" torque may be generated by operating the counterweight system alone or in combination with some other drive unit(s), such as e.g. a wind turbine generator operated as a motor, auxiliary gear motor (s), etc.

In some implementations, the method may further comprise operating a locking unit (if present in the pitch system) for causing locking of the rotation of the counterweight beam-mass (of the counterweight system). This locking of the counterweight system may be caused once a desired position of the counterweight beam-mass has been achieved. This may ensure that the beam-mass will remain in said desired position.

In some implementations of the method, the desired position of the hub may be e.g. a position in which the blade can be mounted horizontally.

A method is also provided for mounting two blades to a hub of a wind turbine by using any one of the previously described counterweight systems. The hub may be mounted to a nacelle such that the hub is rotatable around a rotation axis with respect to the nacelle. The hub may comprise a blade root region configured to receive a blade root and having a pitch system. The counterweight system may be mounted to said blade root region with the pitch system.

A first blade may be mounted in accordance with any of the examples disclosed herein. Then the pitch system can be operated for causing rotation of the counterweight mass for causing rotation of the hub with the first blade to a desired position for mounting a second blade to the hub; and mounting the second blade.

In examples of the method of mounting two blades, the desired position of the hub for each of the blades may be a position in which the blade can be mounted horizontally.

According to examples of the method of mounting the plurality of blades (to the hub), the wind turbine may further comprise a yaw system for rotating the nacelle around a yaw axis (i.e. a longitudinal axis of a tower of the wind turbine). In order to avoid having to reposition a hoisting system such as e.g. a crane, after mounting the first blade, and before mounting the second blade, the yaw system may be operated for rotating the nacelle substantially 180°.

These methods comprising rotating the nacelle by properly operating the yaw system may be especially advantageous when mounting blades to offshore wind turbines. Working space/conditions in offshore installations are usually very restricted. Hence, the proposed rotation of the nacelle for enabling mounting of different blades in a same right-to-left or left-to-right direction may permit reducing complexity and so reducing costs in this type of offshore operations.

According to yet further aspects, a method of mounting three blades to a hub is also provided. The method may comprise a method of mounting two blades according to any of the examples described herein and operating the pitch system for causing rotation of the counterweight mass for causing rotation of the hub with the two blades to a desired position for mounting a third blade to the hub, removing the counterweight system from the hub and mounting the third blade to the hub.

In some examples, the desired position of the hub for the third blade may be a position in which the third blade can be mounted vertically. More particularly, the position of the hub in which the third blade can be mounted vertically may be a position in which the third blade can be mounted in a bottom-up direction.

BRIEF DESCRIPTION OF THE DRAWINGS

Non-limiting examples of the present disclosure will be described in the following, with reference to the appended drawings, in which:

FIGS. 1a-1b schematically represent a front view and a bottom view of a counterweight system according to an example, said counterweight system being mounted to a hub of a wind turbine.

DETAILED DESCRIPTION OF EXAMPLES

Figure 2A:
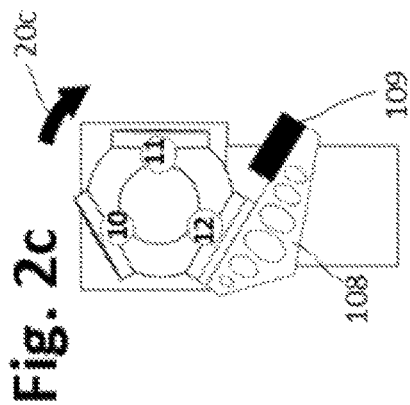
FIGS. 2a-2k schematically illustrate a sequence of situations occurred during performance of a method of mounting a plurality of blades to a hub of a wind turbine, according to an example.

FIGS. 1a-1b schematically represent a front view and a bottom view of a counterweight system according to an example, said counterweight system being mounted to a hub 100 of a wind turbine. FIG. 1a shows said front view. FIG. 1b shows said bottom view from a point of vision 121 shown in FIG. 1a.

The wind turbine is shown having a tower 104, a nacelle 103 mounted on the tower 104, and a hub 100 mounted to the nacelle 103. The hub 100 is mounted to the nacelle 103 in such a way that the hub 100 is rotatable around a rotation axis 120 with respect to the nacelle 103. The hub 100 is shown comprising a first region 11 adapted to receive a blade root, a second region 12 adapted to receive a blade root, and a third region 10 adapted to receive a blade root. Each of these regions 10, 11, 12 may comprise a pitch system (not shown) for rotating a blade to be mounted to said region 10, 11, 12. Said rotation may be about a pitch axis 113, i.e. a longitudinal axis of the blade when mounted to the hub 100.

The pitch system may be a "standard" pitch system, either hydraulic or electromechanical. In some examples, a more powerful pitch system than ordinarily provided on the wind turbine may be used.

The counterweight system of FIGS. 1a and 1b is shown having a beam 108 coupled to the region 12 (configured to receive a blade root and having a pitch system) at a first point 107 of the beam 108. The beam 108 coupled to said region 12 in such a way that the beam 108 is arranged substantially perpendicular to a corresponding pitch axis 113. This counterweight system is shown further comprising a counterweight mass 109 coupled to the beam 108 at a second point 116 of the beam 108 at a distance 114 from the first point 107 of the beam 108.

The hub 100 may be configured to carry a plurality of blades each having a centre of mass. Only one blade 117 having a corresponding centre of mass 118 is shown in FIG. 1a. In some examples, the distance 114 between the first and second points 107, 116 of the beam 108 may be e.g. substantially equal to a distance 119 between the centre of mass 118 of a blade 117 (when mounted to the hub 100) and the hub 100.

Each of the blades 117 that may be carried by (mounted to) the hub 100 may have a corresponding mass. In some examples, the counterweight mass 109 may be substantially equal to said mass of the blade 117.

According to examples of the counterweight system, the beam 108 may be a telescopic beam such that the distance 114 between the first and second points 107, 116 of the beam 108 can be suitably varied.

By properly selecting both the mass 109 and the distance 114, the counterweight system may induce different moments on the hub 100, so that different objectives can be achieved. If the counterweight system is used alone for acting on the hub 100, the distance 114 and the mass 109 may be such that the counterweight system can induce a maximum moment larger than a moment induced by already installed blade(s) 117. This maximum moment may be reached when the counterweight beam-mass 108-109 is arranged in a rotor plane 122 and the telescopic beam 108 (if used) is completely extended. Otherwise, if the counterweight system is used in combination with some other drive unit(s) for acting on the hub, the mass 109 and the distance 114 may be selected further depending on the torque that said other drive unit(s) can provide.

In FIG. 1b, several possible positions 109a-109e of the counterweight mass 109 are shown. A pitch system (not shown) comprised in the region 12 (configured to receive a blade root) may cause rotation of the counterweight mass 109 within a range of substantially 180°, from position 109a to position 109e. The counterweight mass 109 may be positioned, by action of the pitch system, within said range of positions 109a-109e for creating a suitable counterweight to weight loads on the hub 100. Said weight loads on the hub may be due to e.g. the weight of some blade(s) carried by (mounted to) the hub 100.

An aspect of such a rotation of the counterweight mass 109 caused by a pitch system may be that a pre-existing component (aimed at pitching a blade) is re-used for a second "temporary" purpose (counterweighting the hub 100). This counterweighting may induce balanced situations of the hub, which may depend on current and/or future condition(s) of the hub 100.

In some cases, a hub 100 may have some blade(s) mounted to it, so that the counterweight mass 109 may be rotated to a position for compensating some weight load(s) caused by said installed blade(s) and therefore causing a balanced position of the hub 100. In these cases, only currently existing conditions (weight of installed blade(s)) have been taken into account for operating the counterweight system in order to balance the hub 100.

In some other cases, a further blade to be mounted to the hub 100 may also be considered "in advance" for causing an anticipated balanced position of the hub 100, such that the hub 100 will be balanced upon installation of said further blade. In these other cases, future conditions (future blade installation) have been further considered for balancing the hub 100 when said future conditions are met.

Both approaches (based on considering current and/or future conditions) may be advantageous in methods of mounting one or more blades to the hub 100. In a substantially balanced position, the torque that needs to be delivered to the hub may be relatively small in order to establish at least a first movement. Details about this aspect will be provided in other parts of the description with reference to FIGS. 2a-2k.

FIGS. 2a-2k schematically illustrate a sequence of situations occurred during performance of a method of mounting a plurality of blades to a hub of a wind turbine, according to an example. Said method will be described below with reference to said sequence of situations illustrated by FIGS. 2a-2k. For the sake of simplicity, references to FIGS. 1a and 1b may be made along said descriptions.

In the example illustrated, only a counterweight system, such as the one shown in FIGS. 1a and 1b, is used to implement the method. In other words, no additional systems (e.g. wind turbine generator operated as a motor, auxiliary gear motor(s), etc.) are used for acting on the hub. This counterweight system is designed so that it may induce a maximum torque on the hub (when the counterweight beam-mass is arranged within the rotor plane 122) that is larger than the maximum torque induced by the weight of already installed blade(s).

Figure 2B:
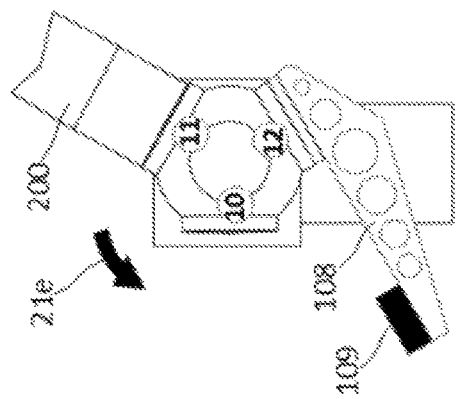
Figure 2C:
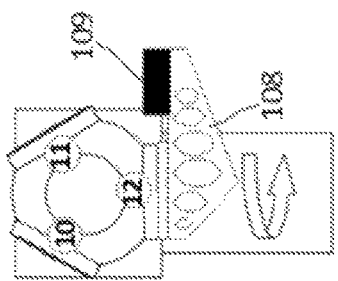
Figure 2D:
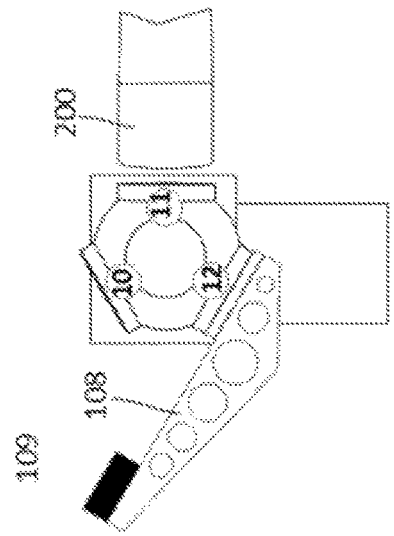
Figure 2E:
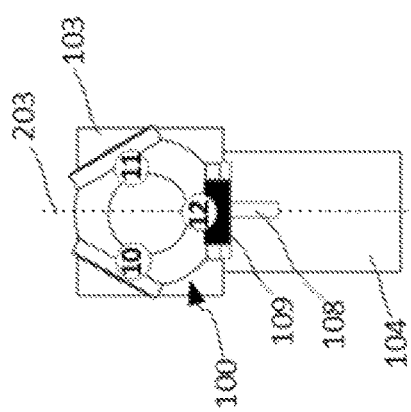
Figure 2F:
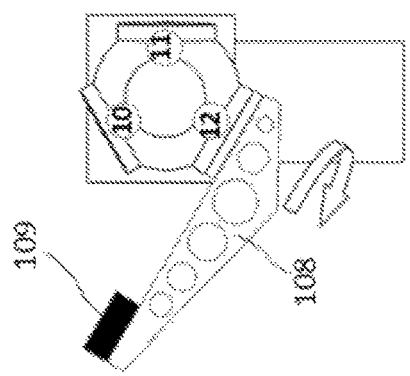
Figure 2G:
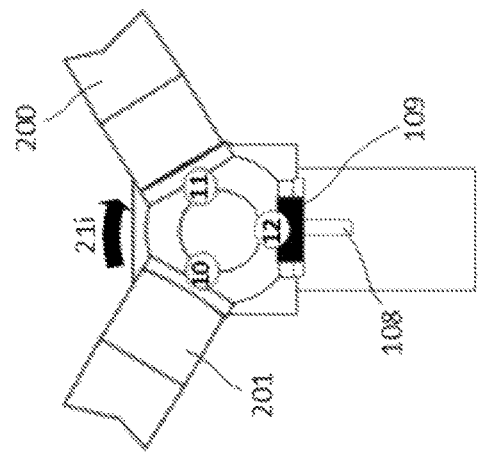
Figure 2H:
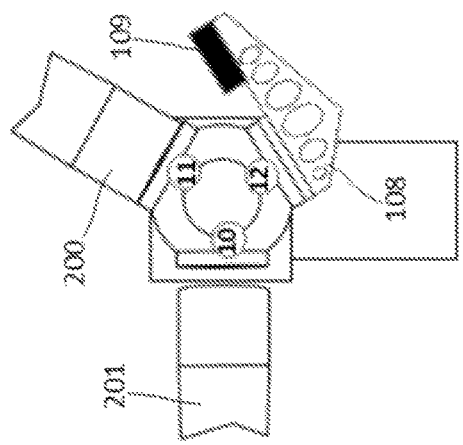
Figure 2I:
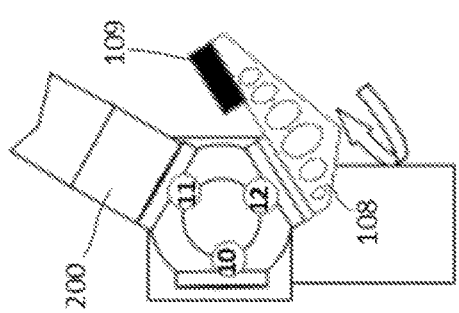
Figure 2J:
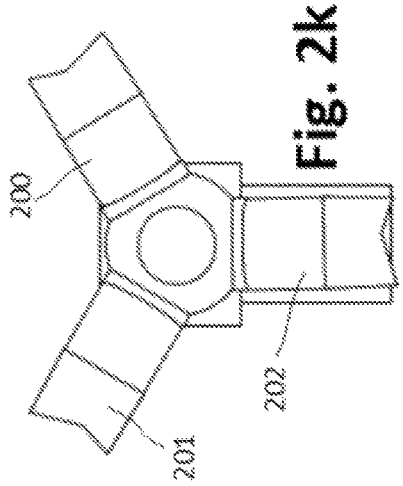
Figure 2K:
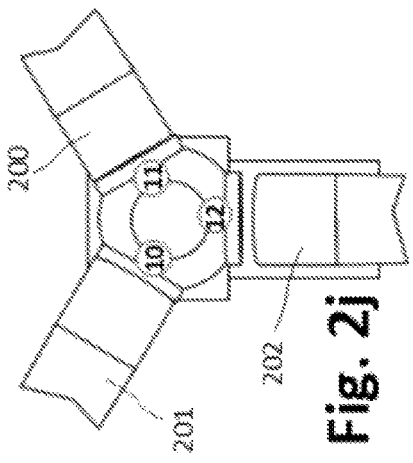

The method of mounting a plurality of blades 200-202 implicitly illustrated by FIGS. 2a-2k may comprise several iterations of a method of mounting a single blade to the hub 100. In particular, FIGS. 2a-2e illustrate a first sequence of situations caused by a first iteration aimed at mounting a first blade 200 to the hub 100. FIGS. 2f-2h illustrate a second sequence of situations caused by a second iteration aimed at mounting a second blade 201. FIGS. 2i-2k illustrate a third sequence of situations caused by a third iteration aimed at mounting a third blade 202.

FIG. 2a illustrates an initial situation in which the hub 100 and the counterweight beam-mass 108-109 are together in a balanced situation. The hub 100, however, is shown in a position which may not be appropriate for installing the first blade 200. The counterweight beam-mass 108-109 is shown substantially perpendicular to the rotor plane 122.

FIG. 2b illustrates that the counterweight beam-mass 108-109 may be rotated to a position which may cause a certain unbalance of the hub 100. Said unbalance of the hub 100 is shown as a result of rotationally moving the counterweight mass 109 towards the rotor plane 122 to the right side when observed from a frontal position.

FIG. 2c illustrates that said rotational movement followed by the counterweight beam-mass 108-109 may cause the hub 100 to rotate in a clockwise direction 20c. This rotation of the hub 100 may be of a magnitude such that the first blade 200 can be mounted horizontally to a desired region 11 of the hub 100. The magnitude of the necessary rotation of the counterweight beam-mass 108-109 for causing the intended effect (rotation of the hub 100) may depend on aspects such as e.g. the mass of the counterweight mass 108-109, distance 114 between mass 109 and pitch axis 113, etc.

In FIGS. 2b and 2c, the counterweight mass 109 is shown moved to e.g. a halfway position between the position perpendicular to the rotor plane 122 of FIG. 2a and a position within the rotor plane 122.

Once the hub 100 is in the desired position for mounting the first blade 200 (e.g. horizontally), the hub 100 may be locked by a corresponding locking unit (if present in the wind turbine). This locking of the hub 100 may ensure that the hub 100 remains in the desired position during the entire mounting operation of the blade 200.

FIG. 2d illustrates that the counterweight beam-mass 108-109 may be rotated (by the pitch system of the region 12) to a position for creating an anticipated counter-torque on the hub 100. This anticipated counter-torque may be of an amount substantially equal to a torque that will be induced by the weight of the first blade 200 once completely mounted to the hub 100. Once the counterweight beam-mass 108-109 is in said desired position (or any other position aimed at achieving the mentioned objective), it may be locked by a corresponding locking unit (if present in the pitch system of the region 12).

The position of the counterweight mass 109 in FIG. 2d is shown as a result of rotationally moving the counterweight mass 109 towards the rotor plane 122 to the left side when observed from a frontal position. This position (of the counterweight beam-mass 108-109) for creating the above-mentioned anticipated counter-torque on the hub 100 may be e.g. a halfway position or a three quarter position between the perpendicular position of FIG. 2a and a position within the rotor plane 122. The amount of said rotation (caused by the pitch system) may depend on aspects such as e.g. the mass of the counterweight mass 108-109, distance 114 between mass 109 and pitch axis 113, etc.

FIG. 2e illustrates that the first blade 200 may be mounted to a desired region 11 of the hub 100. The first blade 200 may be mounted horizontally to the hub 100 (as shown in FIG. 2e) but other (non-horizontal) orientations may be considered depending on e.g. the particular configuration of the wind turbine. Once the blade 200 has been mounted to the region 11, the hub 100 may become significantly balanced. The weight of the blade 200 and the weight of the counterweight beam-mass 108-109 may induce respective torques on the hub which may substantially cancel each other. Accordingly, since a resultant torque of zero or close to zero may result, the hub 100 may become substantially balanced.

Once the first blade 200 has been mounted to the region 11, the hub 100 may therefore be in a balanced position. Then, a next iteration of the method of installing a single blade may be started from said balanced position of the hub 100. FIG. 2f illustrates said starting of said new iteration. Prior to the operation illustrated by FIG. 2f, the hub 100 may be unlocked for cancelling the locking of the hub 100 occurred in the previous iteration.

FIG. 2f illustrates that the counterweight beam-mass 108-109 may be rotated from the position of FIG. 2e to a position completely or almost within the rotor plane 122. This motion of the counterweight mass 109 may cause a new unbalance on the hub 100 due to a resultant torque resulting from respective weights of the mass 109 and the blade 200. This forced unbalance (of the hub 100) may be of a magnitude suitable for causing the hub 100 to rotate in an anti-clockwise direction 21e to a desired position. Said position of the hub 100 may be such that a second blade 201 may be mounted horizontally to a desired region 10 of the hub 100.

In the situation illustrated by FIG. 2f, the hub 100 may be locked by a corresponding locking unit (if present in the wind turbine). This locking of the hub 100 may ensure that the hub 100 will remain in the desired position for mounting the second blade 201.

FIG. 2g illustrates that the counterweight beam-mass 108-109 may be rotated (by the pitch system) to a position that may cause the hub 100 to be again in an anticipated balanced situation taking into account the future installation of the second blade 201. Once the counterweight beam-mass 108-109 is in the desired position, it may be locked by a corresponding locking unit (if present in the pitch system).

FIG. 2h illustrates that the second blade 201 may be (horizontally) mounted to a desired region 10 of the hub 100. Once mounted, a torque induced on the hub 100 by the weight of the second blade 201 may be substantially cancelled by a torque induced on the hub 100 by the weight of the first blade 200 and the counterweight beam-mass 108-109. Accordingly, the hub 100 may be now again in a balanced situation caused by a resultant torque equal or close to zero.

Similarly to the situation of FIGS. 2d-2e, the position of the beam 108 may be between a position in the rotor plane 122 and a position perpendicular to the rotor plane.

Then, a next iteration of the method of installing a single blade may be started from said balanced position of the hub 100. FIG. 2i illustrates said starting of said new iteration. Prior to the operation illustrated by FIG. 2i, the hub 100 may be unlocked (by suitably operating the corresponding locking unit) for cancelling the locking of the hub 100 occurred in the previous iteration.

It is worthy of mention that both first and second blades 200, 201 have been described as mounted horizontally to the hub 100. However, the first blade 200 has been described as installed in a right-to-left direction (see FIG. 2e), whereas the second blade 201 has been described as installed in a left-to-right direction (see FIG. 2h). A yaw system (if present in the wind turbine) may be operated for causing a suitable rotation of the nacelle 103 which may permit mounting both blades 200, 201 in a same (right-to-left or left-to-right) direction. This rotation of the nacelle 103 may be of substantially 180° and around a longitudinal axis 203 of the tower 104.

In an example, this rotation of the nacelle 103 may be performed before the situation of FIG. 2h, such that the second blade 201 may be mounted to the hub in a right-to-left horizontal direction.

The proposed rotation of the nacelle 103 may be especially advantageous for mounting blades to offshore wind turbines, where working space/conditions are usually very restricted and where repositioning a crane is hardly feasible.

FIG. 2*i* illustrates that the counterweight beam-mass 108-109 may be rotated to a position (e.g. perpendicular to the rotor plane 122 as in FIG. 2*a*) which may cause the hub 100 to rotate in a clockwise direction 21*i*. This rotation of the counterweight beam-mass 108-109 may be stopped once it has induced the hub 100 to rotate to a position suitable for mounting the third blade 202 to the hub 100. This suitable position of the hub 100 is shown in FIG. 2*i* with the two blades 200, 201 pointing upwards (i.e. "bunny ears" form). This position may permit mounting the third blade 202 to the region 12 of the hub 100 which is currently occupied by the counterweight system.

FIG. 2*j* illustrates that the counterweight system (i.e. the counterweight beam-mass 108-109) may be dismounted from the region 12 of the hub 100. The hub 100 is now in an anticipated balanced situation taking into account the future installation of the third blade 202. FIG. 2*j* further shows that the third blade 202 may be mounted to the hub 100 vertically in a bottom-up direction.

FIG. 2*k* illustrates that the third blade 202 has been mounted to the region 12 of the hub 100. Once mounted, this third blade 202 causes the hub 100 to be in a "final" balanced situation in combination with the other previously installed blades 200, 201.

In other examples, rotation(s) of the hub 100 may be induced by a combination of operating the counterweight system and operating some other drive unit(s), such as e.g. a wind turbine generator operated as a motor, auxiliary gear motor(s), etc. In these other examples, the counterweight system may be required to create smaller torque(s) on the hub 100 for causing its rotation to desired position(s). Therefore, the counterweight mass 109 may be rotated to positions different from those described with reference to FIGS. 2*a*-2*k*, depending on the torque(s) provided by said some other drive unit(s).

These other drive units may also be used to retain/release (lock/unlock) the hub 100 in certain positions as an alternative of operating a locking unit as described with respect to FIGS. 2*a*-2*k*.

Further variations to the methods of installation are available when the distance of the counterweight mass to a proximal end of the beam can be varied, e.g. with a telescopic beam or with a slidable counterweight mass.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

What is claimed is:

1. A counterweight system for a wind turbine comprising a hub mounted to a nacelle such that the hub is rotatable around a rotation axis with respect to the nacelle, the hub comprising a blade root region configured to receive a root of a blade and having a pitch system configured to rotate the blade around a pitch axis; the counterweight system comprising:
   a beam mountable to the blade root region at a first point of the beam and a counterweight mass coupled to the beam at a second point of the beam at a distance from the first point of the beam, such that, when the beam is mounted to the blade root region, the beam is arranged substantially perpendicular to the pitch axis and the pitch system can cause the counterweight mass to rotate around the pitch axis.

2. A counterweight system according to claim 1, wherein the hub is configured to carry a plurality of blades each having a mass; and wherein the counterweight mass is substantially equal to the mass of a blade.

3. A counterweight system according to claim 2, wherein the beam is a telescopic beam such that the distance between the first and second points of the beam can be varied.

4. A counterweight system according to claim 3, wherein the wind turbine is a direct drive wind turbine.

5. A counterweight system according to claim 2, wherein the wind turbine is a direct drive wind turbine.

6. A wind turbine comprising a hub and a counterweight system according to claim 2, wherein:
   the counterweight system is mounted to the blade root region.

7. A counterweight system according to claim 1, wherein the beam is a telescopic beam such that the distance between the first and second points of the beam can be varied.

8. A counterweight system according to claim 7, wherein the wind turbine is a direct drive wind turbine.

9. A counterweight system according to claim 1, wherein the wind turbine is a direct drive wind turbine.

10. A wind turbine comprising a hub and a counterweight system according to claim 1, wherein the counterweight system is mounted to the blade root region.

11. A method of mounting a blade to a hub of a wind turbine by using a counterweight system according to claim 1, wherein
    the counterweight system is mounted to the blade root region having the pitch system; the method comprising:
    operating the pitch system for causing rotation of the counterweight mass, thereby inducing a rotation of the hub to a desired position for mounting the blade to the hub;
    mounting the blade to the hub.

12. A method according to claim 11, further comprising operating a locking system of the wind turbine for locking the hub once the desired position for mounting the blade to the hub has been achieved.

13. A method according to claim 12, further comprising:
    operating the pitch system for causing rotation of the counterweight mass to a position for at least partially compensating for a variation of torque on the hub due to weight loads resulting from mounting the blade to the hub.

14. A method according to claim 13, wherein operating the pitch system for at least partially compensating for the variation of torque on the hub is performed before mounting the blade to the hub, such that the variation of torque is compensated in advance.

15. A method according to claim 11, further comprising operating a locking unit of the pitch system for locking the rotation of the counterweight mass once a position for at least partially compensating for a variation of torque on the hub has been achieved.

16. A method according to claim 11, wherein the desired position of the hub is a position in which the blade can be mounted horizontally.

17. A method of mounting two blades to a hub of a wind turbine by using a counterweight system, the wind turbine comprising a huh mounted to a nacelle such that the hub is rotatable around a rotation axis with respect to the nacelle, the hub comprising a blade root region configured to receive a root of a blade and having a pitch system configured to rotate the blade around a pitch axis; and the counterweight system comprising a beam mountable to the blade root region at a first point of the beam and a counterweight mass coupled to the beam at a second point of the beam at a distance from the first point of the beam, such that, when the beam is mounted to the blade root region, the beam is arranged substantially perpendicular to the pitch axis and the pitch system can cause the counterweight mass to rotate around the pitch axis; the method comprising:

mounting a first blade according to claim 11;

operating the pitch system for causing rotation of the counterweight mass, thereby inducing rotation of the huh with the first blade to a desired position for mounting a second blade to the huh; and mounting the second blade to the hub.

18. A method according to claim 17, wherein the desired position of the hub for each of the blades is a position in which the blades can be mounted horizontally.

19. A method according to claim 18, wherein:

the wind turbine further comprises a yaw system for rotating the nacelle around a yaw axis; and the method further comprising operating the yaw system for rotating the nacelle substantially 180° before mounting the second blade.

20. A method for mounting three blades to a hub of a wind turbine comprising a method of mounting two blades according to claim 17, and further comprising operating the pitch system for causing rotation of the counterweight mass, thereby inducing rotation of the hub with the two blades to a desired position for mounting a third blade to the hub;

removing the counterweight system from the hub; and mounting the third blade to the hub.

\* \* \* \* \*